Aug. 10, 1965    H. E. TREADAWAY    3,199,778
PRICE COMPUTING DEVICE
Filed June 24, 1963    3 Sheets-Sheet 1

Herbert E. Treadaway
INVENTOR.

BY *[signatures]*
*Attorneys*

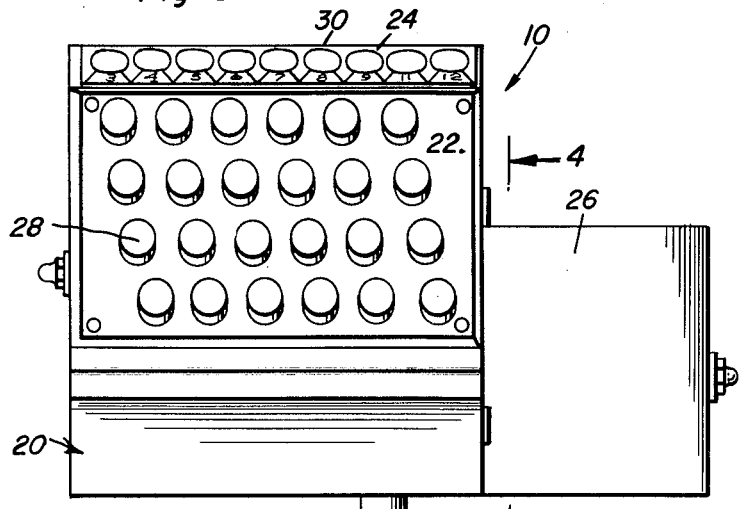
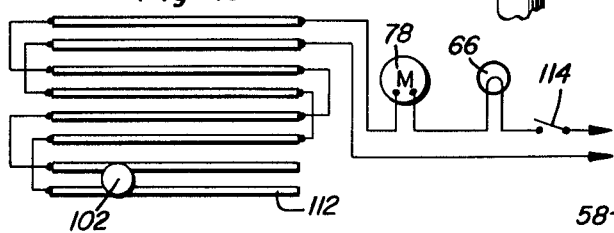
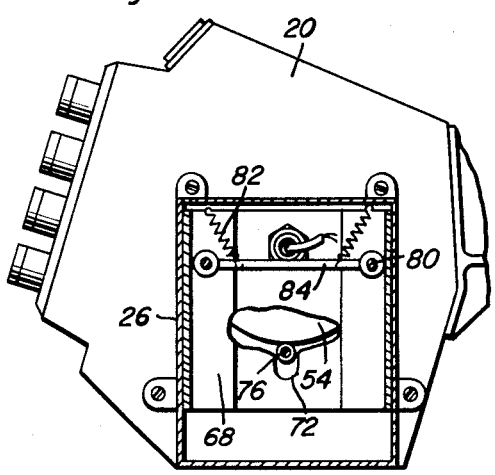
Herbert E. Treadaway
INVENTOR.

Herbert E. Treadaway
INVENTOR.

BY *Clarence A. O'Brien*
*and Harvey B. Jackson*
Attorneys

United States Patent Office 3,199,778
Patented Aug. 10, 1965

3,199,778
PRICE COMPUTING DEVICE
Herbert E. Treadaway, Bandon, Oreg., assignor of fifty percent to Kenneth E. McKay and Don Borneman, both of Coos Bay, Oreg.
Filed June 24, 1963, Ser. No. 289,977
16 Claims. (Cl. 235—87)

This invention relates to a new and useful device for computing and displaying the unit price of commodities which have been priced for sale in multiple quantities.

The device of the present invention is particularly useful in retail stores wherein many articles, goods or foodstuffs are priced and sold on the basis of multiple quantities. Very often however, it is necessary to provide the customer with the sale price for a single unit. Where a large merchandising operation is involved, the time expended in computing the single unit price where much of the commodities are priced on a multiple quantity basis, is considerable. Also, there is a tendency under such conditions to make errors. The more rapid and accurate computing facilities of the present invention will therefore be desirable. Also, the increase in the unit commodity profit made in the unit sale price as compared to the multiple quantity sale price, will economically justify the cost of a device made in accordance with the present invention.

It is therefore a primary object of the present invention to provide a device which will rapidly and accurately compute and display the unit price of articles, foodstuffs, etc. retailed on the basis of a multiple quantity.

Another object of the present invention in accordance with the foregoing object, is to provide a device which will display stored information obtained by depression of one of a plurality of selector buttons.

One of the important features of the present invention is the provision of a continuously driven indicia-bearing drum, the drive of which is initiated while at the same time a stop arrangement is rendered operative so as to positively stop the drum at a preselected location so as to expose to view corresponding information.

The price computing and display device of the present invention also features several constructional details that render the manufacture, assembly and maintenance of the device economical in order to make the device more widely available. Accordingly, the simplicity of construction and operation of the present invention in performing the desired functions and purposes, are of advantageous import.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view of the price computing device.

FIGURE 4 is a partial sectional view taken substantially through a plane indicated by section line 4—4 in FIGURE 3.

FIGURE 9 is a partial illustration of the indicia-bearing surface of the rotatable drum in the device of the present invention.

FIGURE 10 is an electrical circuit diagram corresponding to the device of the present invention.

Figure 1:
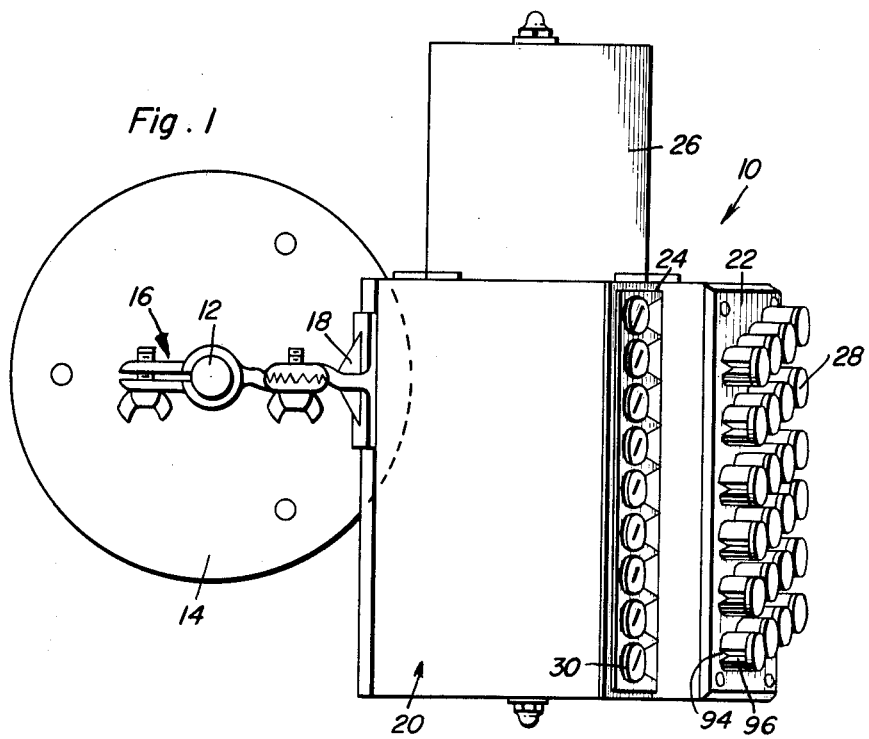
FIGURE 1 is a top plan view of the price computing device.
Figure 2:
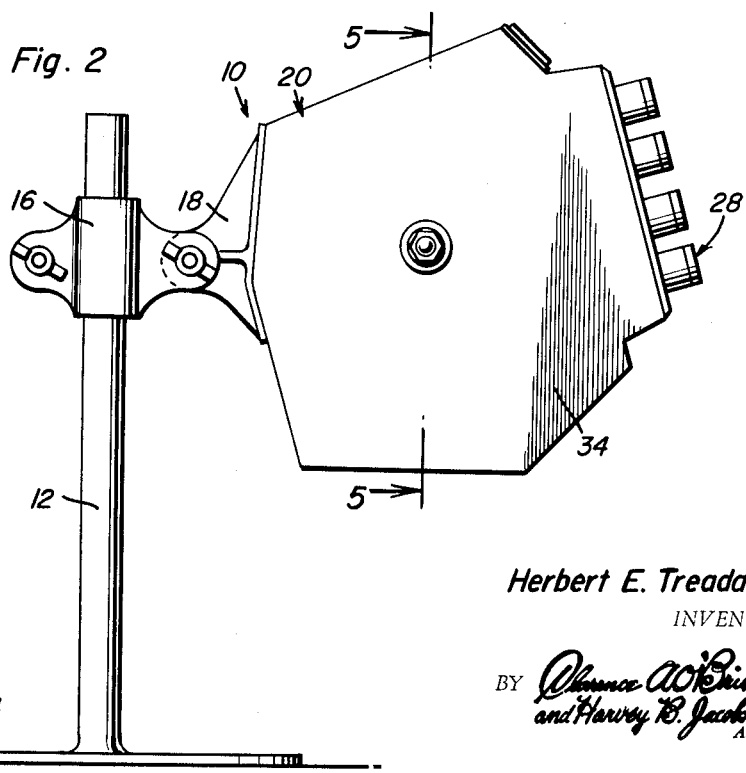
FIGURE 2 is a side elevational view of the price computing device.

Referring now to the drawings in detail, it will be observed from FIGURES 1, 2 and 3, that the price computing device generally referred to by reference numeral 10 may be mounted or supported in proper position by any suitable facility including for example a post 12 having a base portion 14 resting on a supporting surface, said post having a clamp assembly 16 secured in vertically adjusted position thereon. An angularly adjustable supporting attachment 18 is therefore secured to the clamp assembly 16 by means of which the housing or casing 20 of the device may be supported in proper orientated position for use. The housing 20 therefore has secured thereto, a front panel 22 and a display panel 24. Also secured to the housing 20 on one side thereof, is the casing portion 26 for a motor drive assembly. To operate the device, the operator depresses one of a plurality of selector buttons 28 which project from the selector panel 22 in horizontally shifted rows whereupon the information being sought is displayed through one of the display windows 30 mounted above the display panel 24.

Figure 5:
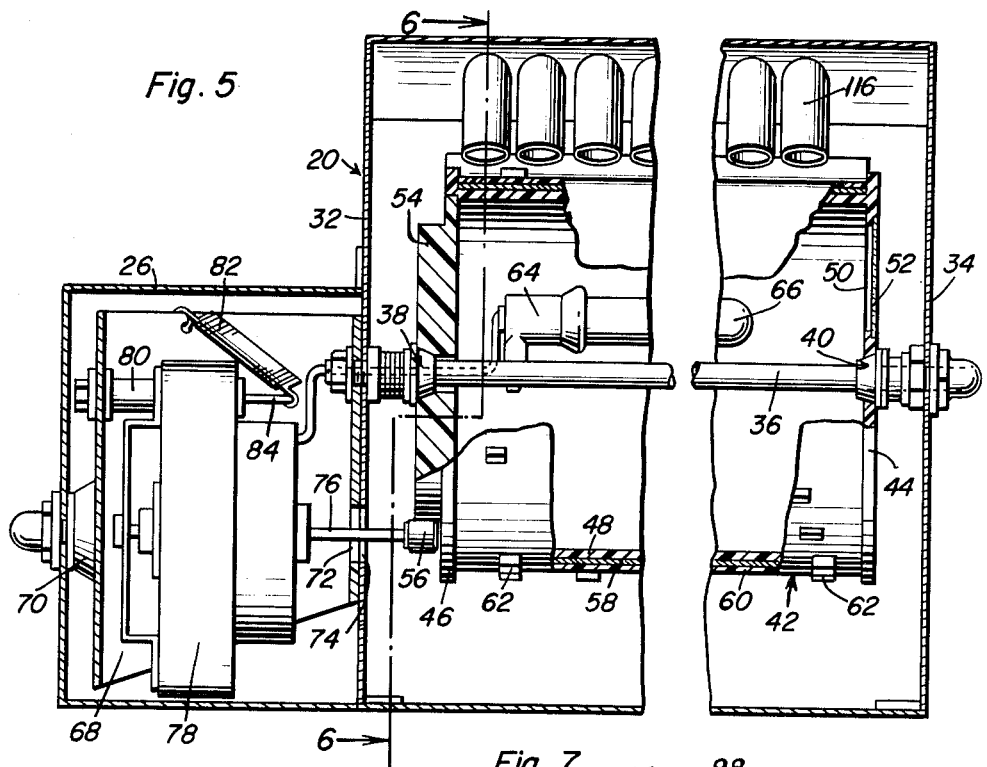
FIGURE 5 is an enlarged partial sectional view taken substantially through a plane indicated by section line 5—5 in FIGURE 2.
Figure 7:
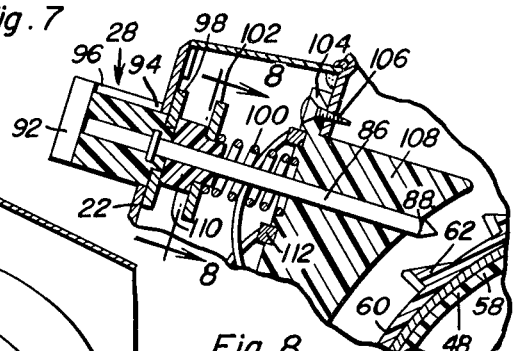
FIGURE 7 is an enlarged partial sectional view of a portion of the device.
Figure 6:
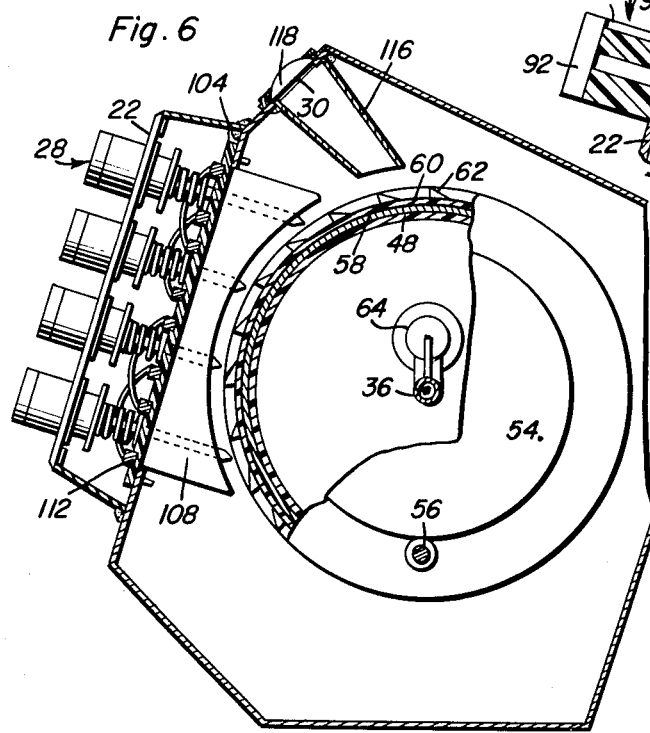
FIGURE 6 is a partial sectional view taken substantially through a plane indicated by section line 6—6 in FIGURE 5.

Referring now to FIGURES 5, 6 and 7, it will be observed that the housing 20 includes end portions 32 and 34 between which a hollow stationary shaft 36 is supported. Mounted adjacent opposite ends of the shaft 36 within the housing, are bearing assemblies 38 and 40 for for rotatably mounting a cylindrical drum assembly 42. The drum assembly 42 includes axially spaced end plates 44 and 46 respectively journaled on the shaft 36 by the bearing assemblies and interconnected by a transparent cylindrical member 48. An access opening 50 is formed in the end plate member 44, the opening being closed by a removable closure member 52. The end plate 46 on the other hand, is provided with a friction gear portion 54 adapted to be frictionally engaged by a friction gear element 56 for imparting rotation to the drum assembly as will hereafter be explained. Mounted on the cylindrical member 48, is a transparent indicia-bearing sheet 58 containing vertical columns of numbers or other such data arranged in non-interferring relating to diagonal rows of spaces 59 as illustrated in FIGURE 9. As more clearly seen in FIGURE 7, the sheet 58 is covered by a transparent outer member 60 having a plurality of stop elements 62 projecting therefrom in alignment with the spaces 59 on the sheet 58, tracing parallel spaced paths when the drum 42 is rotated in the direction indicated by arrow 61 shown in FIGURE 9 so that each path may be interrupted by an end 88 of one selector button 28. Toward this end, the selector buttons 28 are arranged in rows horizontally shifted with respect to the viewing windows 30 so that each button 28 will be vertically aligned with a single stop element which will not obstruct viewing of the indicia which for the purposes of the present invention, is in the form of numbers representing single unit prices. In order to illuminate this indicia, an illuminating assembly is mounted internally of the drum assembly on the shaft 36. Accordingly, secured to the shaft is a bulb socket 64 mounting therein a bulb 66 disposed in parallel spaced relation to the shaft 36. Replacement of the bulb is therefore accommodated through the access opening 50 in the end plate member 44 of the drum assembly upon removal of the closure element 52. The bulb socket 64 is electrically wired to a source of electrical current by electrical conductors that extend through the shaft 36 into the motor drive housing portion 26 as more clearly seen in FIGURE 5.

Secured to the end portion 32 of the housing 20 and disposed within the housing portion 26, is a motor mounting bracket 68. Accordingly, secured to the bracket 68, is a projection 70 by means of which the bracket is secured to the housing portion 26. A vertically elongated slot opening 72 is also formed in the bracket 68 on the side thereof opposite the projection 70 for alignment with the slot 74 in the side portion 32 of the housing 20 in order to accommodate limited vertical displacement of an output shaft 76 to which the friction gear element 56 is connected, the output shaft extending from an electric motor 78 mounted within the bracket 68 for limited displacement. Therefore, as more clearly seen in FIGURES 4 and 5, the motor 78 is provided with a pair of mounting bolt assemblies 80 which extend through vertical slots in the bracket 68. A pair of spring elements 82 are secured to the mounting bolt assemblies 80 which are interconnected by the element 84 so as to bias the motor upwardly in order to bring the friction gear element 56 into driving engagement with the friction gear member 54 formed on the end plate 46 of the drum assembly. A yieldable drive connection is thereby established so that when the motor 78 is energized, continuous rotation will be imparted to the drum assembly. It will however be appreciated, that rotation of the drum assembly may be stopped at some limit position in which case slippage of the friction drive will be accommodated in order to avoid overloading of the motor which will continue to be energized.

Figure 8:
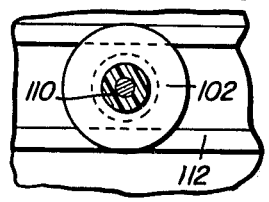
FIGURE 8 is a partial sectional view taken substantially through a plane indicated by section line 8—8 in FIGURE 7.

In order to control intermittent energization of the motor as well as to stop rotation of the drum at different limit positions, a plurality of the selector buttons 28 are slidably mounted and project from the panel 22 as hereinbefore indicated. Each of the selector buttons 28 therefore has numbers printed thereon representing the price of a multiple quantity of commodities. As more clearly seen in FIGURE 7, each selector button is provided with an elongated member 86 having an inner stop end 88 adapted to be displaced into the path of movement of one of the stop elements 62 externally mounted on the drum assembly. The other end of the elongated member 86 is embedded in the projecting actuator portion 28 of the selector button having a top portion 92 on which the price indicia is mounted. The panel 22 is therefore provided with a plurality of circular openings through which the actuator portion 28 of the selector extends, each of these openings being provided with an inward projection 94 received within a groove 96 so as to prevent rotation of the selector and limit inward displacement thereof. Secured to the actuator portion 28 of the selector, on the inside of the panel 22, is a limit washer 98 by means of which the selector is held assembled in the housing in its released position to which it is biased by means of the springs 100. Each of the springs 100 is therefore disposed about the elongated member 86 reacting between a circuit closing disk element 102 and a non-conductive plate member 104 secured to the housing by means of fastener elements 106 in spaced relation to the panel 22. The non-conductive plate member 104 is provided with inwardly projecting portions 108 terminating in spaced relation to the cylindrical outer surface of the drum assembly and slidably mounting there within, the elongated members 86. The springs 100 therefore urge the elongated members to a position wherein the stop ends 88 thereof will clear the stop elements 62. When the actuator portion 28 of the selector is depressed against the bias of the spring 100, the inner stop end 88 thereof will then be disposed in the path of movement of one of the stop elements 62 so as to positively stop rotation of the drum assembly at a limit position corresponding to the selector button depressed. Also, when the selector button is depressed, the circuit closing disk element 102 spaced from the washer element 98 by a spacer 110 will engage or bridge a pair of conductor strips 112 embedded in the plate member 104 as more clearly seen in FIGURE 8. In this manner, an energizing circuit is completed for both the motor 78 and the illuminating assembly mounted within the drum.

Referring therefore to FIGURE 10, it will be observed that the pairs of conductor strips 112 are disposed parallel to each other and are interconnected in series so that when any one of the selector buttons is depressed, the circuit closing disk 102 thereof will bridge one of the pairs of conductor strips 112 in order to complete an energizing circuit through the motor 78 and the lamp 66. The motor and lamp are therefore wired to a source of electrical power through an on-off switch 114. When one of the selector buttons is actuated, it will therefore be apparent that the energizing circuit completed as a result thereof, will both illuminate the drum 42 and cause rotation thereof until its rotation is stopped when one of the stop elements 62 engages the stopping end 88 of the selector button actuated. Selected numbers on the indicia-bearing sheet 58 will then be exposed through the display windows 30 in the panel 24 and will also be illuminated by the lamp while the drum is held stationary in one of its limit positions 66. When the selector button is released, the energizing circuits for the motor and lamp will be opened at the same time that the stop element is released. Exposure of the numbers through the display windows 30 corresponding to the selector buttons is obtained by means of a plurality of viewing tubes 116 which are secured to the display panel 24 and project inwardly toward the external surface of the drum as more clearly seen in FIGURES 5 and 6. Also mounted on the display windows 30 are lens elements 118 whereby the numbers on the sheet 58 may be more easily viewed together with the indicia printed on the display panel 24 below each display window.

From the foregoing description, the construction and operation of the price computing and display device, will be apparent. In the exemplary illustration, twenty-four selector buttons are shown each bearing both an odd number and an even number corresponding to prices of multiple quantities of items on sale. Also, nine display windows 30 are shown with numbers appearing there below on the panel 24 corresponding to different quantities of items, these numbers consisting of three through nine, eleven and twelve. The stop elements 62 on the drum assembly are therefore arranged so that when any of the selector buttons is actuated, the numbers illuminated on the sheet 58 will be viewed through the display windows 30 when the drum 42 is held stationary corresponding to the unit prices computed in connection with the price indicated on the actuated selector button. For example, when the actuator button bearing the price numbers 97 and 96, is actuated, the number 33— will appear under the first display window labelled by the quantity number 3. Accordingly, if the multiple quantity price is 97¢, the unit price will be 33¢. If on the other hand, the button was actuated in connection with a multiple quantity price of 96¢, or the lower even number appearing on the actuator button, the negative sign to the right of the number 33 appearing in the display window indicates that the unit price should be reduced by one or 32 representing the unit price corresponding to 96¢. The unit price based upon other quantities of items will of course appear under the other display windows. In this manner, the unit price information being sought may be obtained both rapidly and accurately. It should of course be appreciated, that the device may be modified in accordance with requirements for different ranges of prices and quantities.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A computing device comprising; a housing having a plurality of quantity display windows therein, a movable member operatively mounted in said housing bearing indicia for exposure through said display windows, drive means yieldably engageable with said movable member for frictional displacement thereof when energized, a plurality of selectors movably mounted on said housing, means responsive to and during the period of actuation of any of said selectors for energizing said drive means, and stop means mounted on said movable member for engagement by said selectors when actuated to stop movement of the movable member in different positions corresponding to the selector actuated exposing said indicia through said display windows.

2. The combination of claim 1, including illumination means mounted within said movable member for illuminating the indicia when exposed through said display windows, and means for energizing said illumination means in response to said actuation of any of said selectors to illuminate the indicia as viewed through said display windows only when the movable member is held stationary by one of the selectors.

3. The combination of claim 2 wherein said means for energizing the drive means comprises, a plurality of pairs of electrical conductors mounted in the housing adapted to be bridged by the selectors upon actuation thereof, and means interconnecting said pairs of conductors in series with each other to complete an energizing circuit through said drive means and said illumination means when one of said pairs of conductors is bridged by one of said selectors.

4. A device for computing and displaying the unit price of commodities having prices based on different quantities thereof, comprising: a housing having a plurality of quantity display windows therein, a movable member operatively mounted in said housing bearing indicia for exposure through said display windows, drive means yieldably engageable with said movable member for frictional displacement thereof when energized, a plurality of price selectors movably mounted on said housing, means responsive to actuation of any of said selectors for energizing said drive means, stop means mounted on said movable member for enagagement by said selectors when actuated to stop movement of the movable member at different locations corresponding to the selector actuated so that said indicia may be viewed through said display windows, illumination means mounted within said movable member for illuminating the indicia exposed through said display window, and means for energizing said illumination means in response to actuation of any of said selectors to illuminate the indicia viewed through said display windows when the movable member is stopped, said means for energizing the drive means comprising a plurality of pairs of electrical conductors mounted in the housing adapted to be bridged by the selectors upon actuation thereof and means interconnecting said pairs of conductors in series with each other to complete an energizing circuit through said drive means and said illumination means when one of said pairs of conductors is bridged by one of said selectors, said drive means comprising, motor means mounted for limited displacement by the housing, friction gear means drivingly connecting the motor means to the movable member, and spring means biasing the gear means into driving engagement for displacement of the movable member until stopped by the stop means.

5. The combination of claim 4 wherein said stop means comprises, a plurality of stop elements mounted externally of said movable member for movement in different paths respectively intersected by the selectors.

6. The combination of claim 5 wherein each of said selectors comprises, an elongated member slidably mounted by the housing, circuit closing means fixed to said elongated member for establishing an energizing circuit for the drive means and the illumination means, one end of the elongated member adapted to be displaced into the path of said stop means on said movable member, and means biasing said elongated member to a position wherein the circuit closing means is inoperative and said one end is out of the path of movement of the stop means, whereby the selector may be actuated against the bias of said biasing means to simultaneously establish the energizing circuit for the drive means and render the stop means operative to stop the movable member at a predetermined location.

7. The combination of claim 1 wherein each of said selectors comprises, an elongated member slidably mounted by the housing, circuit closing means fixed to said elongated member for establishing an energizing circuit for the drive means, one end of the elongated member adapted to be displaced into the path of said stop means on said movable member, and means biasing said elongated member to a position wherein the circuit closing means is inoperative and said one end is out of the path of movement of the stop means, whereby the selector may be actuated against the bias of said biasing means to simultaneously establish the energizing circuit for the drive means and render the stop means operative to stop the movable member at a predetermined location.

8. The combination of claim 7 wherein said means for energizing the drive means comprises, a plurality of pairs of electrical conductors mounted on the housing adapted to be bridged by the selectors upon actuation thereof, and means interconnecting said pairs of conductors in series with each other to complete said energizing circuit when one of said pairs of conductors is bridged by the circuit closing means of one of the selectors.

9. The combination of claim 8 wherein said stop means comprises, a plurality of stop elements mounted externally of said movable member for engagement by the one end of one of the selectors.

10. The combination of claim 1 wherein said means for energizing the drive means comprises, a plurality of pairs of electrical conductors mounted on the housing adapted to be bridged by the selectors upon actuation thereof, and means interconnecting said pairs of conductors in series with each other to complete an energizing circuit through said drive means when one of said pairs of conductors is bridged by one of said selectors.

11. A device for computing and displaying the unit price of commodities having prices based on different quantities thereof, comprising: a housing having a plurality of quantity display windows therein, a movable member operatively mounted in said housing bearing indicia for exposure through said display windows, drive means yieldably engageable with said movable member for engagement by said selectors when actuated to stop movement of the movable member at different locations corresponding to the selector actuated so that said indicia may be viewed through said display window, said means for energizing the drive means comprising a plurality of pairs of electrical conductors mounted on the housing adapted to be bridged by the selectors upon actuation thereof and means interconnecting said pairs of conductors in series with each other to complete an energizing circuit through said drive means when one of said pairs of conductors is bridged by one of said selectors, said drive means comprising, motor means mounted for limited displacement by the housing, friction gear means drivingly connecting the motor means to the movable member, and spring means biasing the gear means into driving engagement for displacement of the movable member until stopped by the stop means.

12. The combination of claim 11 wherein said stop means comprises, a plurality of stop elements mounted externally of said movable member for movement in different paths respectively intersected by the selectors.

13. A device for computing and displaying the unit price of commodities having prices based on different quantities thereof comprising: a housing having a plurality of quantity display windows therein, a movable member operatively mounted in said housing bearing indicia for exposure through said display windows, drive means yieldably engaging with said movable member for frictional displacement thereof when energized, a plurality of price selectors movably mounted on said housing means responsive to actuation of any of said selectors for energizing said drive means, and stop means mounted on said movable member for engagement by said selectors when actuated to stop movement of the movable member at different locations corresponding to the selector actuated so that said indicia may be viewed through said display windows, said drive means comprising, motor means mounted by the housing for limited displacement, friction gear means drivingly connecting the motor means to the movable member, and spring means biasing the gear means into driving engagement for displacement of the movable member until stopped by the stop means.

14. The combination of claim 1 wherein said stop means comprises, a plurality of stop elements mounted externally of said movable member for engagement by the selectors at locations avoiding exposure through the windows.

15. The combination of claim 14, wherein said stop elements are moved through parallel paths by the movable member, said selectors being mounted in horizontally shifted rows for respectively intersecting one of said parallel paths.

16. A computing device comprising a housing having a plurality of viewing windows, a data bearing member movably mounted within said housing having an external surface portion exposed through said viewing windows, motor means drivingly engaged with said data bearing member for movement thereof, a plurality of stop elements mounted on said data bearing member for movement through different fixed paths, a plurality of manually operable selectors mounted on the housing for respective displacement into said different paths to limit movement of the data bearing member to different limit positions at which the stop elements are engaged, switch means connected to the selectors for energizing the motor means as long as one of the selectors is disposed in one of said fixed paths to effect movement of the data bearing member to said different positions and illuminating means mounted internally of the data bearing member and connected to said switch means for illuminating said surface portion of the data bearing member only when the motor means is energized, whereby the surface portion may be viewed through said viewing windows when stationary only in said different limit positions.

References Cited by the Examiner
UNITED STATES PATENTS

| | | | |
|---|---|---|---|
| 659,835 | 10/00 | Thomas | 235—87 |
| 1,048,973 | 12/12 | Johns | 235—85 |
| 1,486,075 | 3/24 | Crain | 235—87 |
| 1,822,031 | 9/31 | Hoffmeister | 235—62 X |
| 1,966,623 | 7/34 | Fuller | 235—58 |
| 2,416,772 | 3/47 | Reece | 235—61 |
| 2,453,909 | 11/48 | Harwood | 235—87 |
| 2,480,228 | 8/49 | Diamond | 235—87 |
| 2,627,373 | 2/53 | Edwards | 235—87 |

LEO SMILOW, *Primary Examiner.*